United States Patent [19]
Hayashi

[11] 3,871,332
[45] Mar. 18, 1975

[54] APPARATUS FOR SUCKING UP AND TRANSFERRING FISHES

[75] Inventor: Takeshi Hayashi, Naruto, Japan

[73] Assignee: Kyoei Zoki Kabushiki Kaisha, Naruto, Tokushima Pref., Japan

[22] Filed: Oct. 19, 1973

[21] Appl. No.: 407,821

[30] Foreign Application Priority Data
Oct. 28, 1972 Japan............................ 47-108253
Oct. 28, 1972 Japan............................ 47-108254
May 9, 1973 Japan............................. 48-52014

[52] U.S. Cl. ........................................ 119/3, 43/6.5
[51] Int. Cl. .......................................... A01k 63/02
[58] Field of Search............................ 119/3; 43/6.5

[56] References Cited
UNITED STATES PATENTS
3,573,934 4/1971 Mitchell.......................... 119/3
3,583,365 6/1971 Harden............................ 119/3

*Primary Examiner*—Hugh R. Chamblee
*Attorney, Agent, or Firm*—Woodhams, Blanchard and Flynn

[57] ABSTRACT

An apparatus for sucking up and transferring fishes has a hermetically closed tank connected to a fish water suction pipe and to a fish transfer pipe. A fish water sucking up operation through the fish water suction pipe and a fish transferring operation through the fish transfer pipe are alternately changed over whereby fishes caught can be transferred to any desired place with the aid of a mechanical means with a high efficiency.

10 Claims, 20 Drawing Figures

FIG. 14
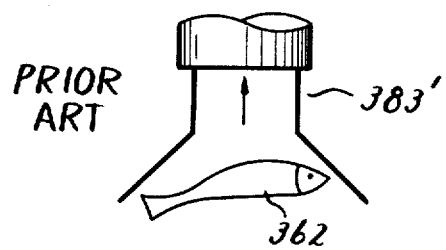
FIG. 15
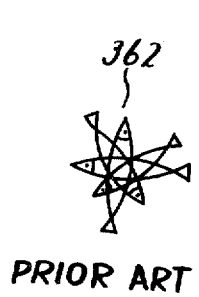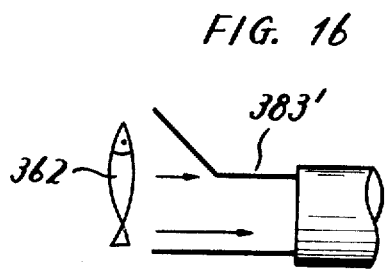
FIG. 16
FIG. 17
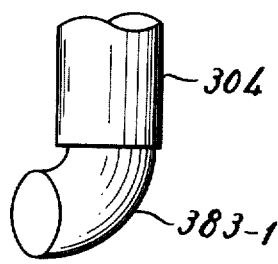
FIG. 18
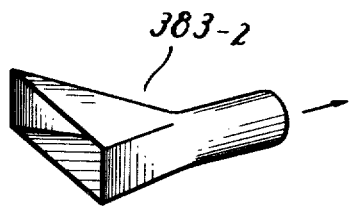
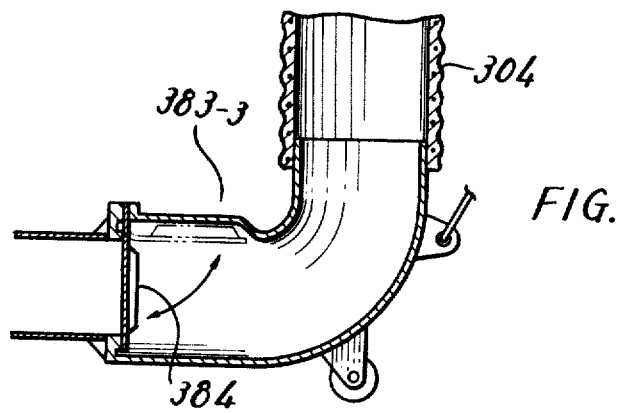
FIG. 19

APPARATUS FOR SUCKING UP AND TRANSFERRING FISHES

This invention relates to apparatuses for sucking up fishes caught by a fishing net at a fishing ground or fishes bred in a fish breeding farm into a tank and then transferring the fishes to a given place such as a fish tank etc., and more particularly to an apparatus for sucking up and transferring fishes which can alternately change-over the fish water sucking up operation and the fish transferring operation.

It has generally been well known that, as an apparatus for sucking up and transferring fishes which is capable of transferring fishes caught by a fishing net at a fishing ground into a fish tank in a carrying vessel or of landing the fishes in a fish tank at a fishing port etc. or of catching fishes bred in a breeding farm with the aid of a mechanical means with a high efficiency, use may preferably be made of an apparatus comprising a fish tank, a vacuum pump for extracting air inside the tank and directly sucking up the fishes in the fish tank together with water through a suction pipe connected to the fish tank, and means for making pressure inside the fish tank higher than the atmospheric pressure and delivering the fishes and water to transfer the fishes to a desired place.

A prior art apparatus for alternatively changing between the fish sucking up step and the fish transferring step in a continuous manner has manually been operated. In addition, it has been difficult to perform the sucking up step and the transferring step of relatively large fishes such as sardines, horse-mackerels, etc. without deteriorating the fish body of these fishes. An apparatus for obviating such difficulty has not been proposed and has not been applied in practice.

An object of the invention is to provide an apparatus for sucking up and transferring fishes which can obviate the above mentioned difficulties, which is simple in construction, which can perform the fish sucking up step and the fish transferring step with a high efficiency in a simple, easy and stable manner, and which can significantly contribute to the fishing industry.

Another object of the invention is to provide an apparatus for sucking up and transferring fishes which can suck up not only small fishes but also large fishes from a low place and transfer these fishes to a high place without deteriorating the fish body in an easy manner, and which can maintain the high quality of fishes and improve the operation efficiency.

A further object of the invention is to provide an apparatus for sucking up and transferring fishes which can simultaneously and continuously perform the fish sucking up step and the fish transferring step, which is relatively small in size and which can suck up and transfer a large volume of fishes in a stable manner without involving any hunting in operation.

Another object of the invention is to provide a multi-purpose apparatus for sucking up and transferring fishes which can suck up and transfer fishes in a fishing net with a fish tank at a fishing ground and can transfer the fishes cooled by ice water in a fish tank onto the wharf of a fishing pier etc. and which is suitable for installation on a fishing boat such as a fish carrying vessel etc.

A still further object of the invention is to provide an apparatus for sucking up and transferring fishes which can make use of one vacuum pump for alternate operations of air extracting and supplying steps and which is simple in construction and has a high transferring efficiency.

A feature of the invention is the provision of an apparatus for sucking up and transferring fishes comprising a hermetically sealed tank provided at its upper portion with an air extraction opening and an air supply opening, respectively, and provided at its lower portion with a fish water suction opening connected to a fish water suction pipe and a fish transfer and water delivery opening connected to a fish transfer and water delivery pipe, respectively, an air extracting means connected to the air extraction opening, an air supply means connected to the air supply opening, a fish water separator for separating the fish water sucked up in the closed tank containing fishes and water, a control means for alternately changing over the air extracting means and the air supplying means and starting and stopping these means, and a control valve means for communicating the fish water suction pipe with the closed tank and closing the fish transfer pipe during the air extracting step and closing the fish water suction pipe and communicating the fish transfer pipe with the closed tank during the air supplying step.

Another feature of the invention is the provision of an apparatus for sucking up and transferring fishes which makes use of two sets of the above described transfer means units and both tanks of these units are operated in parallel by means of a control means which can alternately change over both tanks of the two units to a negative pressure or to a positive pressure.

A further feature of the invention is the provision of an apparatus for sucking up and transferring fishes which can suspend a closed tank by means of a suspension and carrying mechanism arranged above the tank in a fishing boat.

The above described and other objects and features of the invention will clearly be understood by reference to the following detailed description in the specification in connection with the accompanying drawings.

In the specification "fishes" means fishes such as sardines, horse-mackerel, octopus, shell-fishes as well as various kinds of planktons, and "fish water" means that fishes are contained in water.

Figure 8:
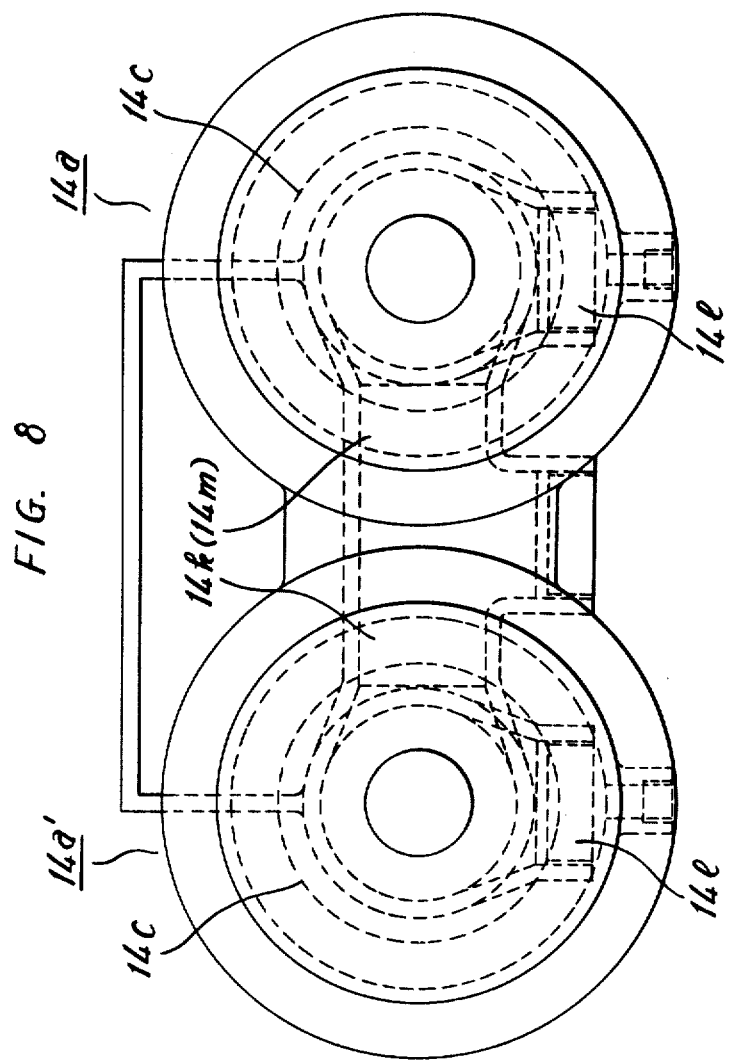
Figure 9:
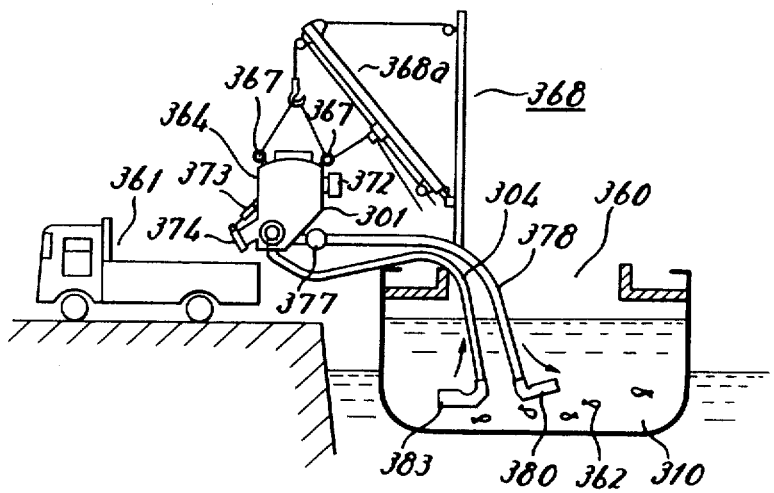
Figure 10:
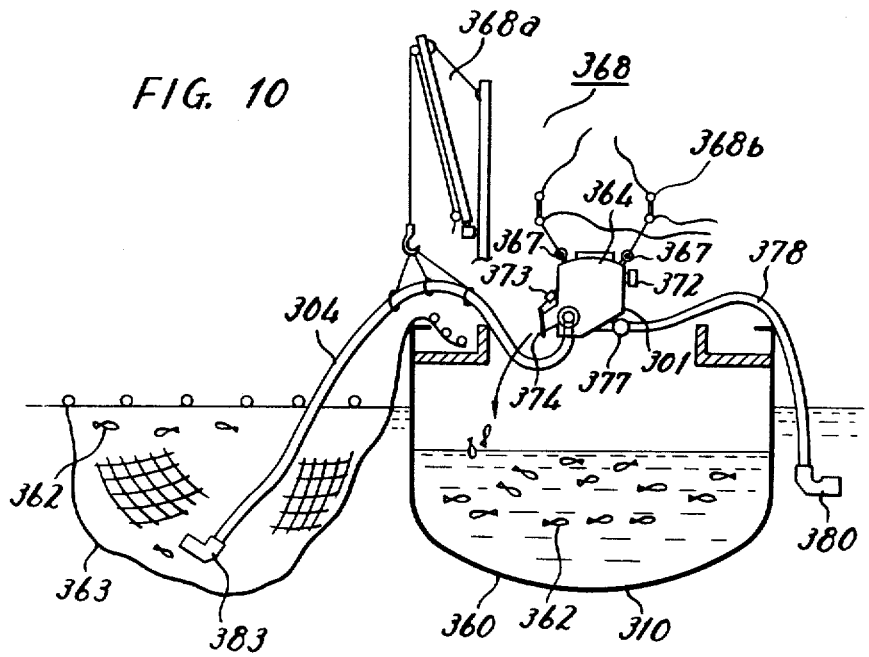
Figure 11:
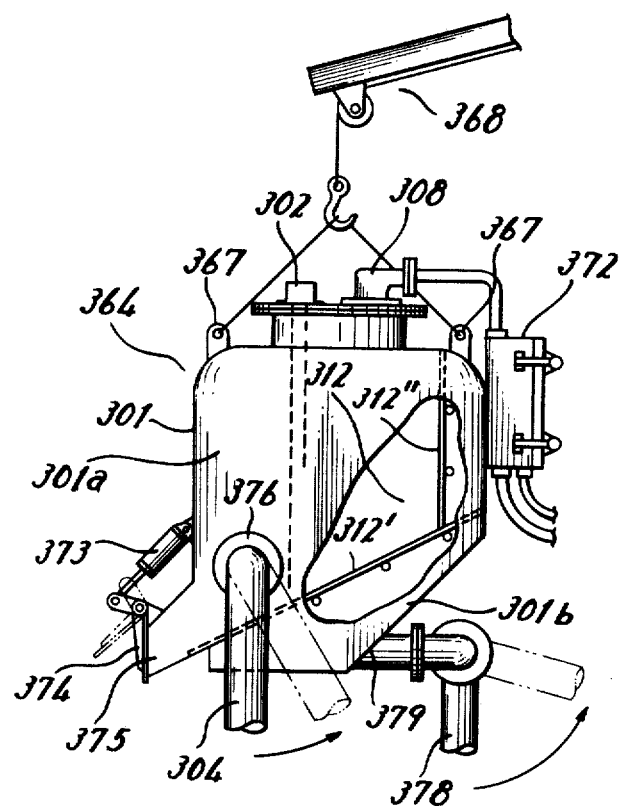
Figure 12:
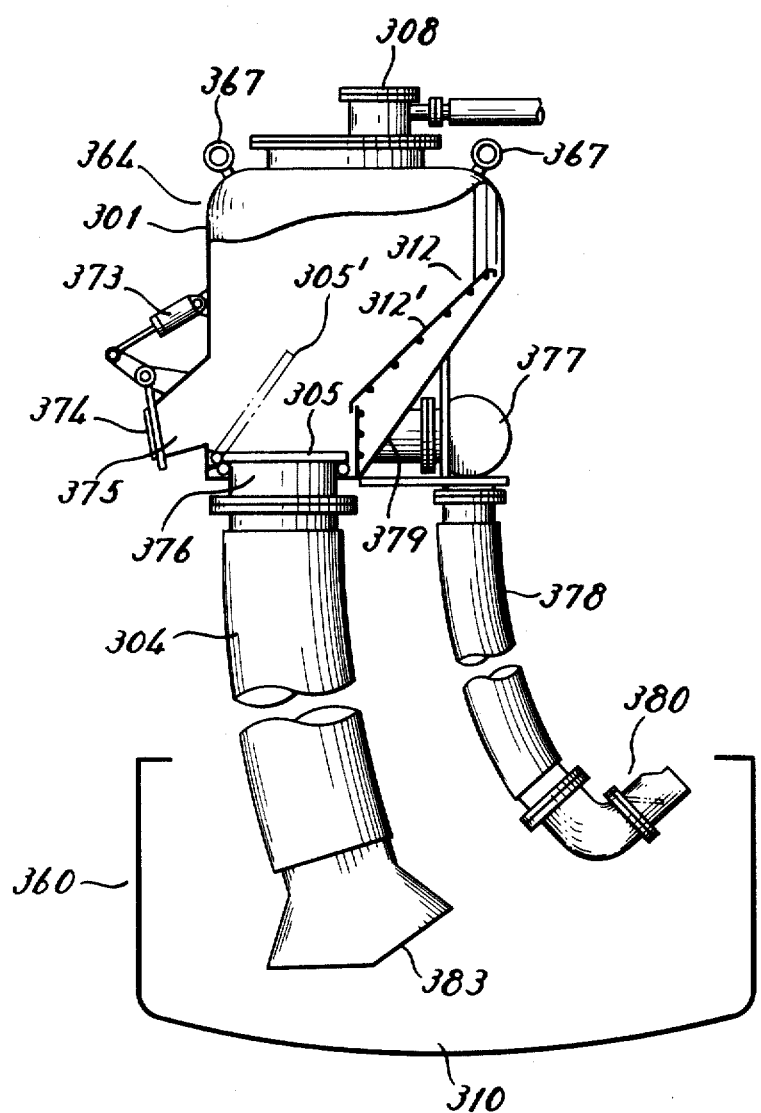
Figure 13:
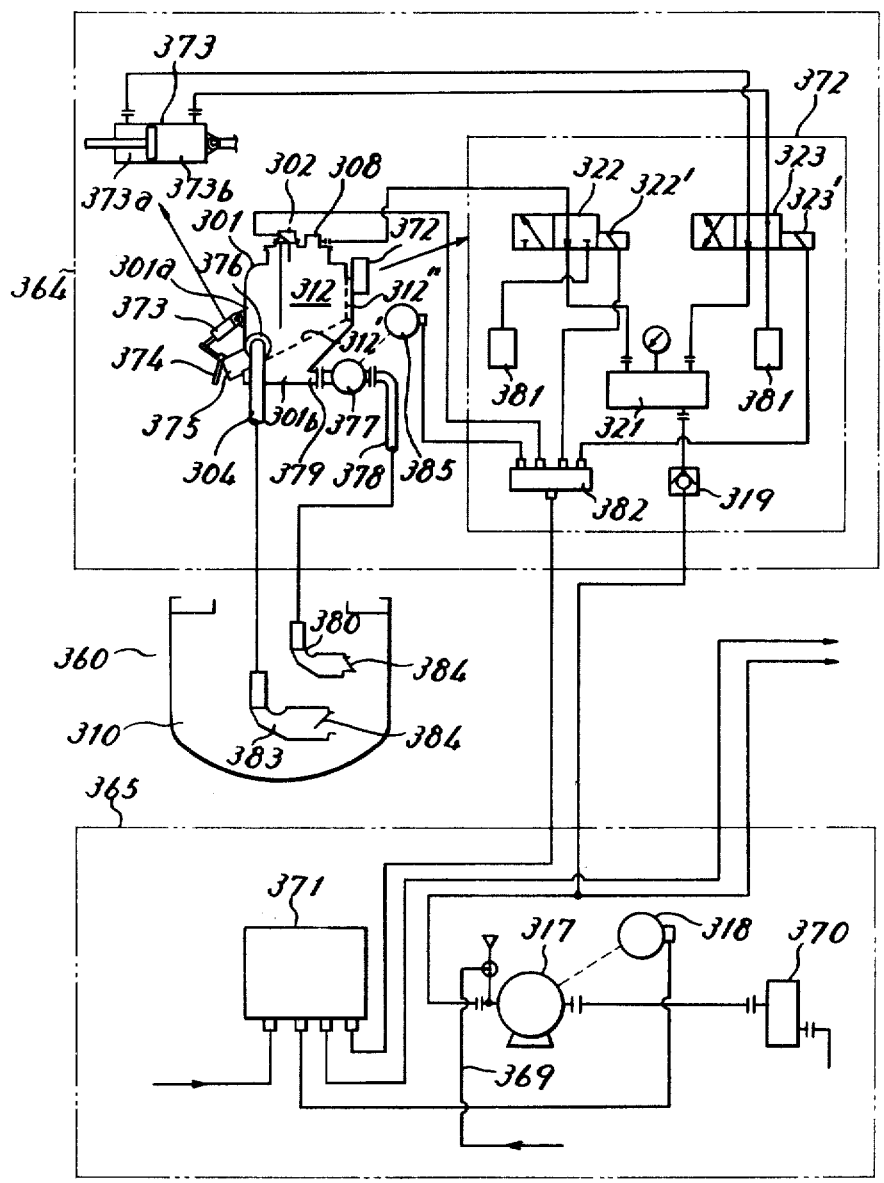

FIG. 8 as its plan view;

FIG. 9 is a diagram illustrating another embodiment of the apparatus according to the invention when it is used for sucking up and transferring fishes onto a truck on a pier;

FIG. 10 is a diagram illustrating another embodiment of the apparatus according to the invention when it is used for sucking up and transferring fishes into a fish tank in a carrying vessel;

FIGS. 11 and 12 are front elevational views of the tank unit used in the embodiments shown in FIG. 9 and 10 partly in section and in an enlarged scale, respectively;

FIG. 13 is a diagram showing the embodiments of the apparatus according to the invention shown in FIGS. 9 and 10 in detail;

FIGS. 14 and 15 are sectional views showing the fish water suction pipe opening fitting used for the prior art apparatus for sucking up and transferring fishes;

FIG. 16 is a sectional view showing one embodiment of the fish water suction pipe opening fitting used for the apparatus according to the invention;

FIG. 17 is a front elevational view showing another embodiment of the fitting shown in FIG. 16;

FIG. 18 is a perspective view showing a further embodiment of the fitting shown in FIG. 16; and FIG. 19 is a sectional view showing a still further embodiment of the fitting shown in FIG. 16.

The operating principle of the apparatus according to the invention will now be described with reference to the flow sheet shown in FIGS. 1(A) and 1(B).

Figure 1:
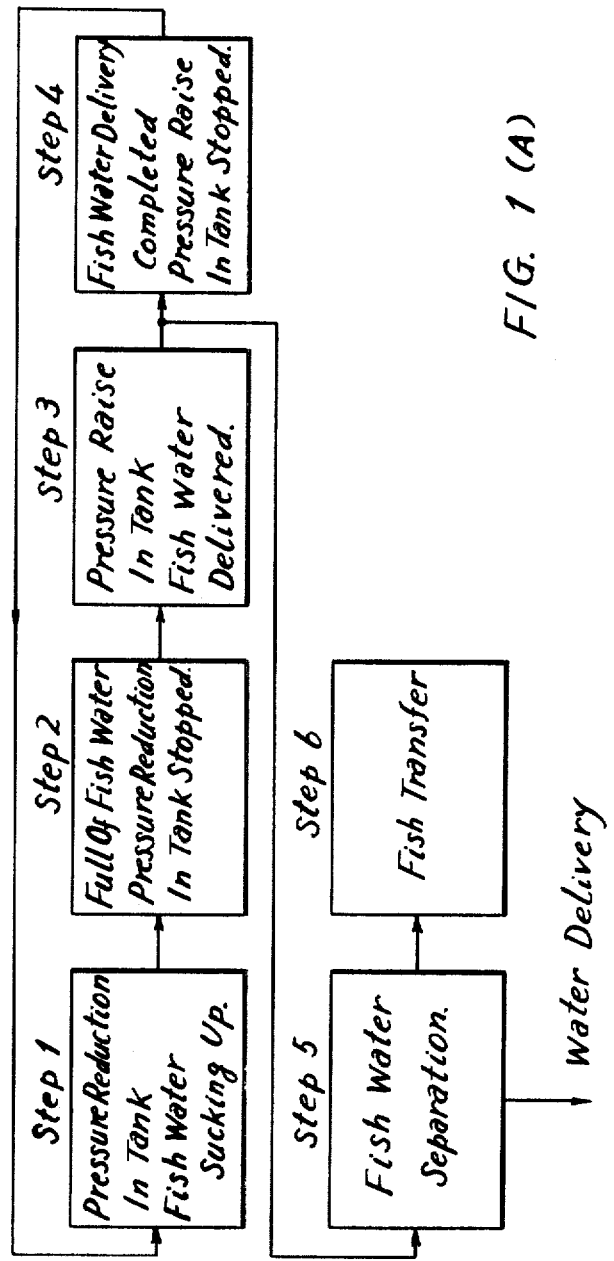
FIG. 1(A) is a flow sheet diagram illustrating the operating principle of the apparatus according to the invention.
FIG. 1(B) is a flow sheet diagram illustrating a modified operation.
Figure 1:
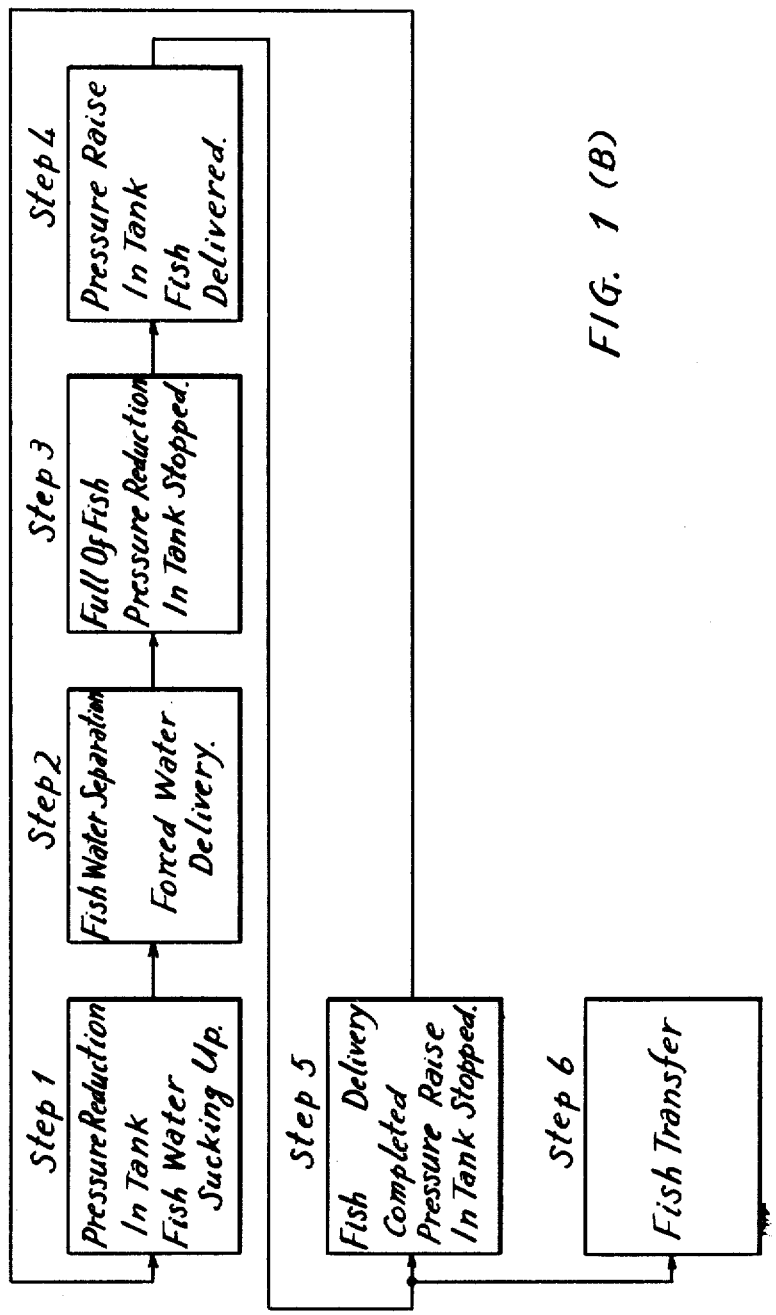

As shown in FIG. 1(A), during the step 1 of reducing pressure in a hermetically closed tank, the pressure in the closed tank is reduced to a vacuum which is far lower than atmospheric pressure to suck up water or sea water containing fishes (hereinafter abbreviated as fish water) through a suction pipe into the tank.

When the closed tank is filled with the fish water, the pressure reducing operation is stopped at the step 2. Then, the closed tank is changed over to the step 3 where the pressure in the tank is raised to a pressure which is equal to or higher than the atmospheric pressure to supply air and transfer the fish water through a delivery pipe out of the tank. After delivery of the fish water, when the tank becomes vacant the pressure raising operation is stopped at the step 4.

It is a matter of course that at the step 1 the fish water delivery pipe must be closed and that at the step 3 the fish water suction pipe must be closed.

After the fish water has been delivered, the step 1 is started again and a series of operations inclusive of steps 1 to 4 are repeated in a cyclic manner. Between the third and fourth steps, a fish water separator causes the fishes and water to be separated one from the other at the step 5 and then the fishes are transferred to a given place at the step 6, thereby completing the sucking up and transfer of the fishes.

Figure 2:
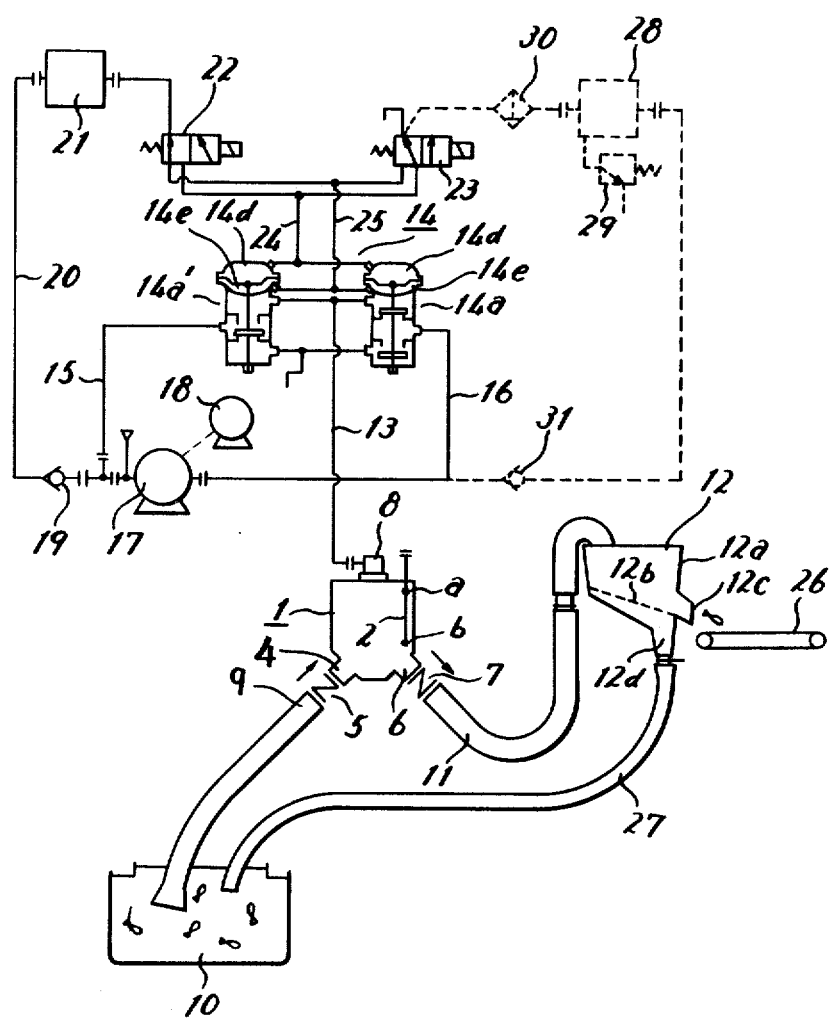
FIG. 2 is a diagram showing one embodiment of the apparatus for sucking up and transferring fishes constructed on the basis of the principle according to the invention.

The apparatus for sucking up and transferring fishes based on the above mentioned operating principle are shown in FIGS. 2 and 8.

In FIG. 1(B), the pressure in the closed tank is reduced in by the step 1 to suck up the fish water into the tank. The fish water in the closed tank is separated into the fishes and water by means of the fish water separator and water only is forcedly delivered through a water delivery pipe, that is, the fish water separating operation stroke is carried out at the step 2. When the closed tank is filled with the fishes, the pressure reducing operation is stopped at the step 3 and the pressure in the tank is raised to a pressure which is equal to or higher than the atmospheric pressure by an air supplying operation at the step 4.

As a result, the fishes are gradually transferred out of the closed tank. After the fishes have been transferred out of the closed tank, the presssure raising operation is stopped at the step 5 and then is changed over to the step 1. This cycle is repeated to alternately effect the fish sucking up step and the fish transfer step.

Between the steps 4 and 5, the fishes are transferred to a given place with the aid of a suitable transfer mechanism at the step 6.

The apparatus for sucking up and transferring the fishes based on the above mentioned operating principle illustrated with reference to FIG. 1(B) is shown in FIGS. 9 to 13.

Figure 3:
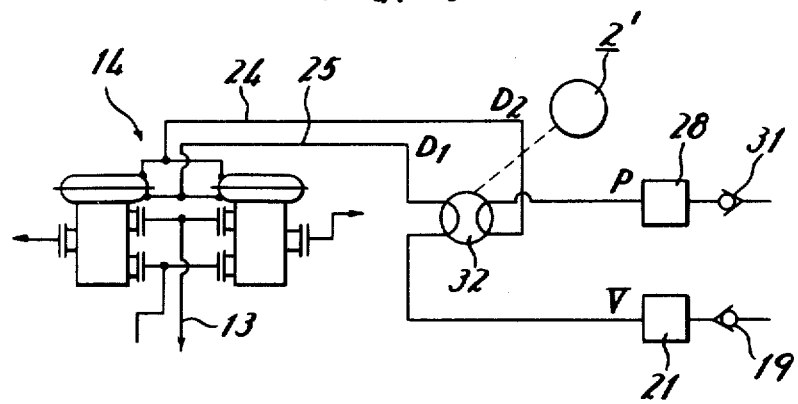
FIG. 3 is a diagram showing a modification of a part of the control means shown in FIG. 2.
Figure 4:
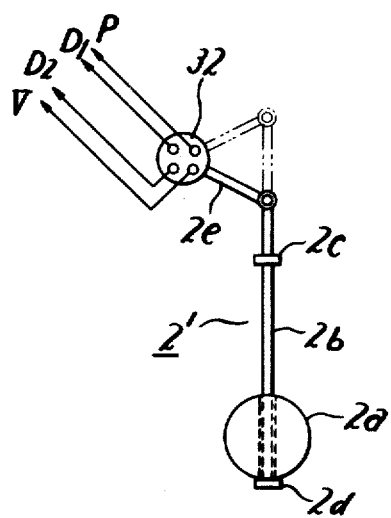
FIG. 4 is a diagram showing the valve changing over mechanism shown in FIG. 3.

The invention will now described in greater detail with reference to various embodiments shown in the drawings. Referring now to FIGS. 2 to 4 showing a single system for alternately driving the apparatus for sucking up and transferring fishes according to the invention, reference numeral 1 designates a hermetically closed tank for sucking up, storing and transferring fishes under pressure. The closed tank 1 is provided therein with a float switch 2 which can detect the upper limit level a and the lower limit level b of the water level in the tank 1 and deliver an electric signal. The closed tank 1 is provided at its lower side wall portions with a check valve 5 which can prevent a counterflow toward the outside of tank and connected to a fish water suction pipe 4 and with a check valve 7 which can prevent a counterflow toward the inside of tank and connected to a fish delivery pipe 6. The closed tank 1 is also provided at its top wall portion with an opening 8 through which air is fed and extracted.

To the end of the fish water suction pipe 4 is connected a flexible suction hose 9 having a suitable length and whose free end is made open into a fish tank 10 located below the closed tank 1. To the end of the fish water delivery pipe 6 is connected a flexible delivery hose 11 whose free end is open into a fish water separator 12.

The air supply and extraction opening 8 is selectively communicated through a pipe 13, diaphragm type four way valve 14 and pipes 15, 16 with the suction side or exhaust side of a vacuum blower 17 driven by a motor 18.

Figure 7:
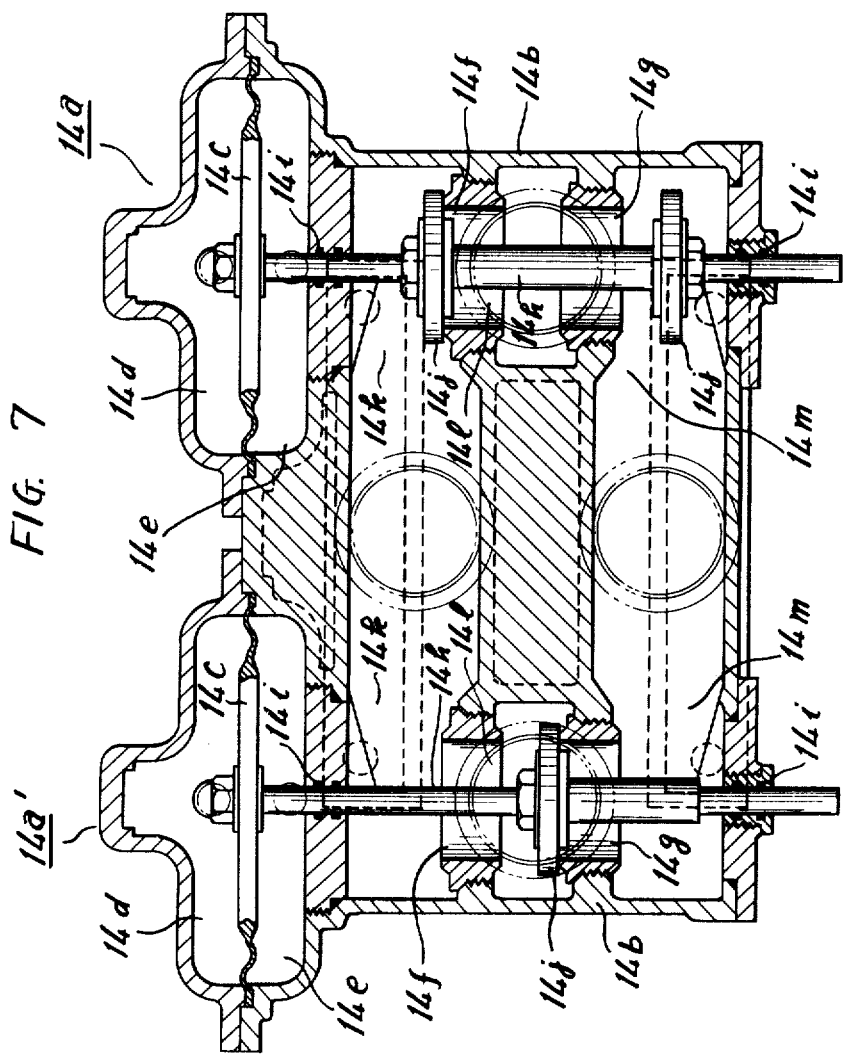
FIG. 7 is a longitudinal sectional view of the four way change-over valve of the apparatus shown in FIGS. 2 and 5.

As shown in FIGS. 7 and 8, the four way valve 14 is comprised of a combination of two sets of three way valves 14a, 14a'. Each of these valves 14a, 14a' is provided at the upper end portion of its vertical valve body 14b with two chambers 14d, 14e divided by a diaphragm 14c.

The valve body 14b is divided into three chambers by valve seats 14f, 14g and extended at its center axis through by a vertical valve stem 14h whose upper end is secured to the center part of a diaphragm 14c. The valve stem 14h is slidably supported through packings 14i, 14i by the valve body 14b and provided near the valve seats 14f, 14g with one or two valve plate 14j secured to the valve stem 14h and adapted to selectively close the valve seats 14f, 14g, respectively.

The diaphragm 14c is provided at its center part with a disc-shaped core made of steel and engaged with the valve stem 14h. The diaphragm 14c is comprised of a flexible disc-shaped body whose upper and lower surfaces and periphery are covered with a synthetic rubber layer. The diaphragm 14c is dimensioned such that its area under pressure is considerably larger than the opening area of the valve seats 14f, 14g and that the valve stem 14h can overcome the counter pressure applied to the valve plate 14j and can slide upwardly and downwardly under a relatively small pressure.

In the three way valves 14a, 14a' constructed as above described, change-over ports 14k, 14k which open at the side wall parts of the upper chamber of the valve body 14b are connected with each other through a pipe and then are connected through a pipe 13 to the air supply and extraction opening 8. Change-over ports 14m, 14m which open at the side wall parts of the lower chamber of the valve body 14b are connected with each other through a pipe and then made open to the outside atmosphere. In addition, a port 14l which open at the side wall part of the center chamber of the valve body 14b of the right side change-over valve 14a is connected through a pipe 16 to the exhaust side of the vacuum blower 17, while a port 14l which opens at the side wall part of the center chamber of the valve body 14b of the left side change-over valve 14a' is connected through a pipe 15 to the suction side of the vacuum blower 17.

The upper chambers 14d, 14d and lower chambers 14e, 14e of the valves 14a, 14a' of the four way valve 14 are connected with each other, respectively, and are connected through pipes 24 and 25 in parallel with change-over ports of off-set type electromagnetic valves 22, 23, respectively. The upper chambers 14d, 14d are connected to a port which becomes open when the electromagnetic valve 22 is excited and to a port which becomes open when the electromagnetic valve 23 is not excited, respectively. The lower chambers 14e, 14e are connected to a port which becomes open when the electromagnetic valve 22 is not excited and to a port which becomes open when the electromagnetic valve 23 is excited, respectively. A common side port of the electromagnetic valve 22 is connected through a pressure reducing tank 21, pipe 20, and check valve 19 for preventing a counterflow toward the pressure reducing tank 21 from the suction side of the vacuum blower 17. A common side port of the electromagnetic valve 23 is made open to the outside atmosphere or connected through a filter 30, pressure tank 28 inclusive of a pressure adjusting mechanism 29 and a check valve 31 for preventing a counterflow from the pressure tank 28 to the exhaust side of the vacuum blower 17.

In the apparatus for sucking up and transferring fishes comprising the above described piping connection shown in FIG. 2, reference numeral 26 designates a fish transfer conveyor and 27 shows a water delivery hose for feeding water from the fish water separator 12 back to the fish tank 10.

The fish water separator 12 is comprised of a box-shaped body 12a open at its top and provided at its side with a fish outlet opening 12c and at its lower part with a water outlet opening 12d. The box-shaped body 12a is provided at its intermediate portion with a partition plate 12b inclined downwardly toward the lower edge of the fish outlet opening 12c. The partition plate 12b is comprised of a number of flat or round bars arranged side by side in parallel normal to the inclined direction of the separating plate 12b and spaced from each other or a wire net which permits water to pass therethrough, but prevents passage of the fishes therethrough.

The apparatus for sucking up and transferring fishes constructed as above described according to the invention will operate as follows. At first, the open end of the suction hose 9 is immersed into water in the fish tank 10 and the electromagnetic valves 22, 23 are not excited. Then, the vacuum blower 17 is operated. As a result, the pressure in the pressure reducing tank 21 connected to the suction side of the vacuum blower 17 becomes lowered to produce a negative pressure, thereby gradually increasing the degree of vacuum. Since the lower chambers 14e, 14e of the four way valve 14 are connected through the electromagnetic valve 22 to the pressure reducing tank 21 on the one hand and the upper chambers 14d, 14d are connected through the electromagnetic valve 23 to the outside atmosphere on the other hand, the difference in pressure between the lower and upper chambers causes the diaphragm 14c to move downwardly so that the ports 14l and 14m of the three way valve 14a communicate with each other, and the ports 14k and 14l of the three way valve 14a' are communicate with each other.

As a result, the exhaust side of the vacuum blower 17 is made through the pipe 16, and ports 14l, 14m of the three way valve 14a open to the outside atmosphere, while the suction side of the vacuum blower 17 communicates through the pipe 15, ports 14l, 14k of the three way valve 14a', pipe 13 and air supply and extraction opening 8 with the inside of the closed tank 1. Thus, the vacuum blower 17 operates as a vacuum pump to exhaust the closed tank 1, thereby making the pressure in the closed tank 1 negative. As a result, the fish water in the fish tank 10 is sucked up through the suction hose 9 and pipe 4 into the closed tank 1, that is, the fish water sucking up step is effected. The liquid level in the fish tank 1 is gradually increased and the float switch 2 arrives at its upper level limit a. Then, the float switch 2 causes both the electromagnetic valves 22, 23 to be changed over. Thus, the upper chamber 14d of both the three way valves 14a, 14a' of the four way valve 14 is communicated with the pressure reducing tank 21 and the lower chamber 14e is communicated with the outside atmosphere, thereby changing over the valve. As a result, the suction side of the vacuum blower 17 is made open to the outside atmosphere and the exhaust side is communicated with the closed tank 1. Thus, the vacuum blower 17 operates as a pressure pump to make the pressure in the upper space in the closed tank 1 positive.

The fish water remaining in the closed tank 1 is pushed downwardly through the fish water delivery pipe 6 and delivery hose 11 into the fish water separator 12 where the fish water is separated into the fishes and water. The fishes are transferred onto the conveyor 26 and water is fed back through the delivery hose 27 into the fish tank 10, thereby effecting the fish water transferring step under pressure.

If the fish water in the closed tank 1 is decreased and its level arrives at the lower level limit b of the float switch 2, the float switch 2 is changed over to demagnetize the electromagnetic valves 22, 23 whereby the apparatus is changed over to the above described fish water sucking up step.

As described above, the apparatus according to the invention is capable of effecting the change-over between the fish water sucking up step and the fish water transferring step under pressure in response to the lower and upper level limits of the amount of the fish water in the closed tank 1 and hence transferring the fishes in the fish tank 10 to any desired place.

In FIGS. 3 and 4 are shown essentials of another embodiment of the apparatus according to the invention. In the apparatus shown in FIG. 2, the pilot pressure control system of the four way valve 14 is comprised of an electric signal-pneumatic pressure converter inclusive of the float switch 2 enclosed in the closed tank 1 and the electromagnetic valves 22, 23. In the present embodiment shown in FIGS. 3 and 4, a float 2a is mounted on a rod 2b such that the float 2a is movable between an upper stopper 2c and a lower stopper 2d. The float 2a causes the rod 2b through the upper and lower stoppers 2c, 2d to move upwardly and downwardly, respectively. These upward and downward movements of the rod 2b are transmitted through an arm 2e to a four way valve 32. Thus, the present embodiment makes use of the pilot pressure control system comprising a mechanical displacement-pneumatic pressure converter. The embodiment shown in FIGS. 3 and 4 is the same in function and effect as the embodiment shown in FIG. 2.

The above mentioned apparatus makes it possible to alternately change-over the pressure in the closed tank between a negative pressure and a positive pressure so that one closed tank only is capable of effectively transferring the fishes to any desired place. In addition, the apparatus makes use of a negative pressure for sucking up the fishes and a positive pressure for transferring the fishes under pressure. Thus, the invention can suck up the fishes from a lower place and transfer the fishes toward a higher place in a simple manner, and as a result, the quality of the fishes can effectively be maintained without deteriorating the fish body.

In addition, the four way valve 14 through which sea water passes is comprised of a diaphragm type change-over valve so that it is possible to utilize the negative pressure of the vacuum blower 17 as a driving source of the change-over operation. As a result, the control system becomes extremely simplified and the slidable part in contact with sea water is made extremely small in configuration and area if compared with the slidable part of a rotary spool type or a rectilinear spool type valve. Thus, the apparatus according to the invention has the advantage that the slidable part is not deteriorated after a long use and hence the apparatus is significantly stable in operation, and that the use of one vacuum blower 17 for both the sucking up and transferring of the fishes ensures a compactness of the apparatus.

Figure 5:
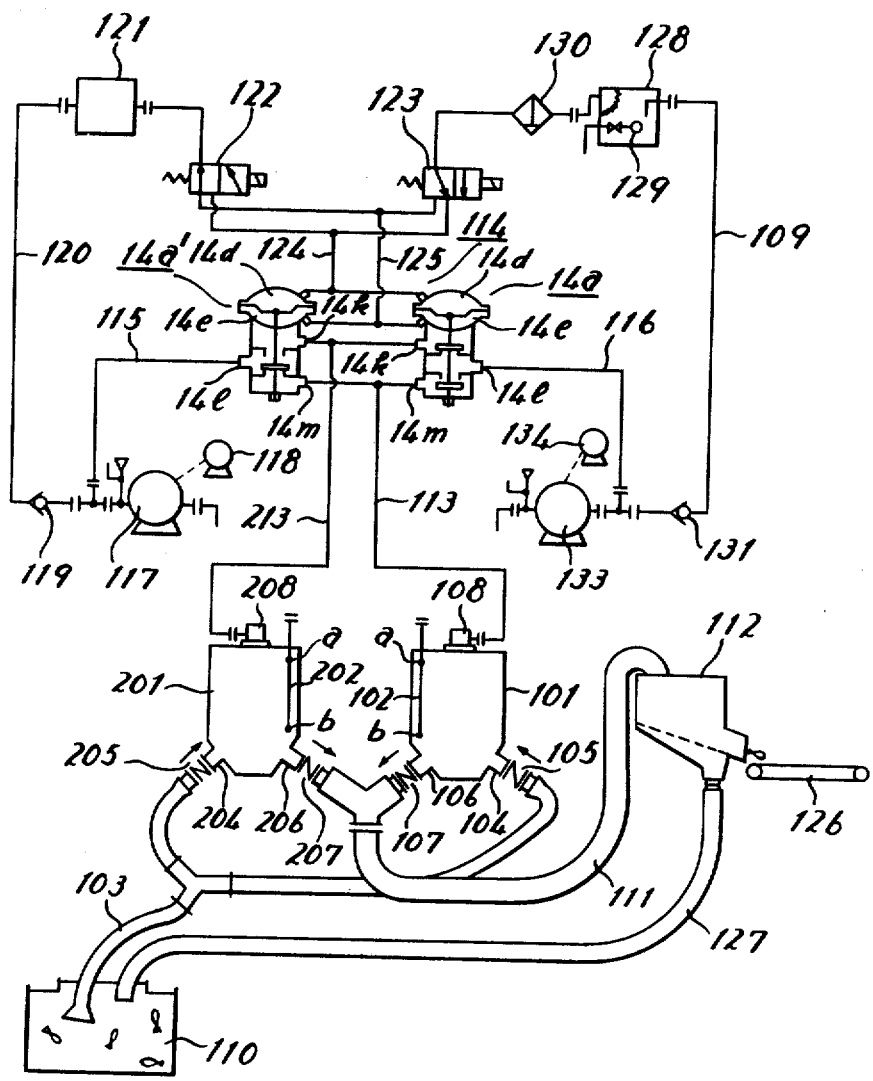
FIG. 5 is a diagram showing another embodiment of the apparatus for sucking up and transferring fishes according to the invention.
Figure 6:
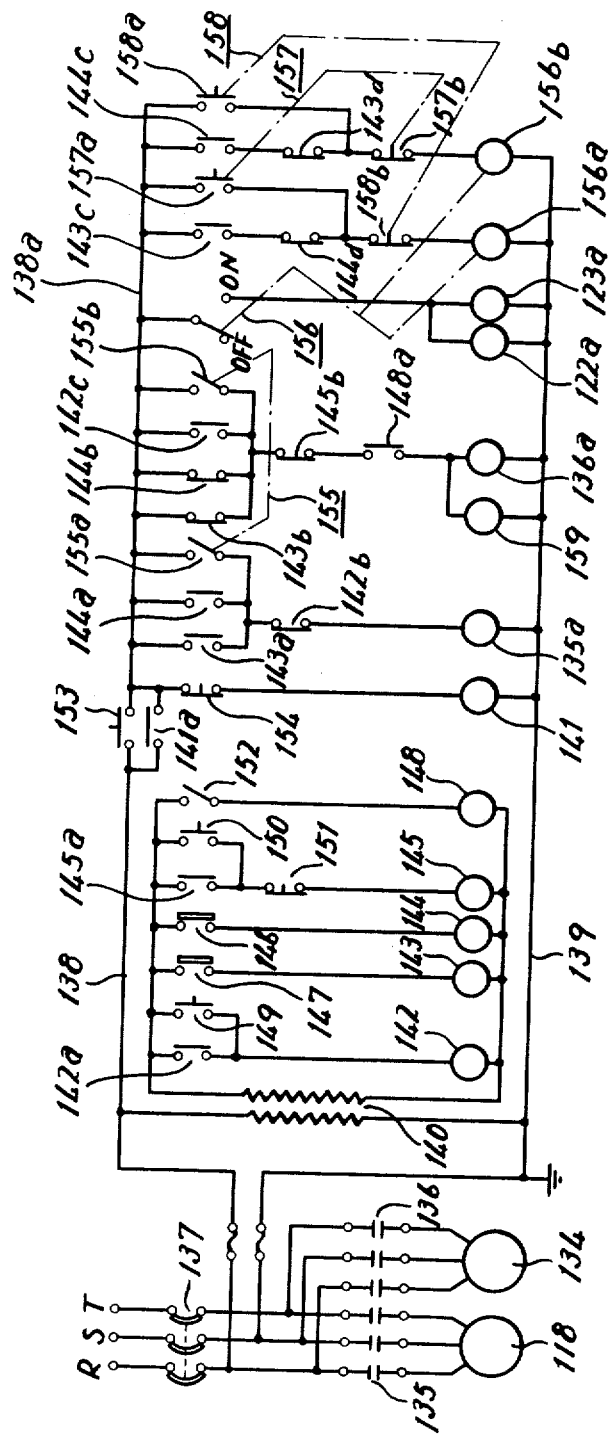
FIG. 6 is a circuit diagram showing the electric control circuit of the apparatus shown in FIG. 5.

In FIGS. 5 and 6 are shown a parallel operating system for continuously effecting the fish sucking up and transferring operations. In the present embodiment, a tank unit comprising closed tanks 101, 201 is the same in construction and operation as the tank 1 shown in FIG. 2. A four way valve 114 and fish water separator 112 are also the same in construction and operation as the four way valve 14 and fish water separator 12 shown in FIG. 2. Thus, these members are not described in detail. Piping system which is different from that shown in FIG. 2 will hereinafter be described.

Two hermetically closed tanks 101, 201 are arranged side by side and provided with fish water suction pipes 104, 204 and fish water delivery pipes 106, 106, respectively. To the end of each of the fish water suction pipes 104, 204 is connected in common a flexible suction hose 103 having a suitable length and to the end of each of the fish water delivery pipes 106, 106 is connected in common a flexible delivery hose 111.

The free end of the common suction hose 103 is opened into a fish tank 110 arranged below the closed tanks 101, 201. The free end of the common delivery hose 111 is communicated with a fish water separator 112.

In addition, the closed tanks 101, 201 are provided with air supply and extraction openings 108, 208, respectively, which are connected through pipes 113, 213 to change-over ports of diaphragm type four way changeover valves 114, 114, respectively. In addition, the other ports of the change-over valves 114, 114 are connected through pipes 115, 116 to the suction side of a vacuum pump 117 driven by a motor 118 and to the exhaust side of a pressure pump 133 driven by a motor 134, respectively.

The upper operating chambers 14d, 14d and lower operating chambers 14e, 14e of two change-over valves of a four way change-over valve 114 communicate with each other, respectively, and these chambers are connected through pipes 124, 125 in parallel with changeover ports of spring biased type electromagnetic valves 122, 123, respectively. The upper operating chambers 14d, 14d communicate with ports which become open when the electromagnetic valve 122 is exited and ports which become open when the electromagnetic valve 123 is not excited, respectively. The lower operating chambers 14e, 14e communicate with a port which becomes open when the electromagnetic valve 122 is not exicted and with a port of the electromagnetic valve 123 which becomes open when it is excited, respectively. A common side port of the electromagnetic valve 122 is connected through a pressure reducing tank 121, pipe 120 and a check valve 119 which prevents a counterflow toward the pressure reducing tank 121 from the suction side of a vacuum pump 117. A common side port of the electromagnetic valve 123 is connected through a filter, pressure tank 128 inclusive of a pressure adjusting mechanism 129, pipe 109 and a check valve 131 which prevents a counterflow from the pressure tank 128 to the exhaust side of a pressure tank 133 or is made open to the outside atmosphere.

In FIG. 6 there is shown an electric circuit for controlling the apparatus for sucking up and transferring fishes shown in FIG. 5. In FIG. 6, reference numerals 135, 136 designate electromagnetic switches connected through power source switches 137 to three phase source terminals R,S,T, respectively. The electromagnetic switch 135 plays a role of starting and stopping the motor 118 for driving the vacuum pump 117 and the electromagnetic switch 136 plays a role of starting and stopping the motor 134 for driving the pressure pump 133.

138 shows a non-grounded control bus bar and 139 shows a grounded bus bar. Across the bus bars 138, 139 is connected a step-down transformer 140. Non-grounded control bus bar 138 is connected, through a starting push button switch 153 connected in parallel with a self-holding contact 141a of a relay 141, to a bus bar 138a. Across the secondary side of the step-down transformer 140 are connected a series circuit including a coil of a relay 142 and a push button switch 149 for full exhaust connected in parallel with a self-holding contact 142a of the relay 142, a series circuit including a coil of a relay 143 and a contact 147 of a float switch 202, a series circuit including a coil of a relay 144 and a contact 146 of a float switch 102, a series circuit including a coil of a relay 145, a push button switch 151 for feeding back and a push button switch 150 for stopping the transfer under pressure connected in parallel with a self-holding contact 145a, and a series circuit including a coil of a relay 148 and a limit switch 152, respectively. The float switches 102, 202 are of flip-flop type which can hold the contacts 146 and 147 in their closed state while the fish water rises from the lower level limit $b$ to the upper level limit $a$ and can hold the contacts 146 and 147 in their open state while the fish water lowers from the upper level limit $a$ to the lower level limit $b$. As a result, when one of the tanks 101, 201 is sucking up the fish water and the other tank is transferring the fish water under pressure, that is, when the apparatus is in its normal operation, the float switch of the tank for sucking up the fish water, for example, the float switch 102 of the tank 101 causes the contact 146 to close, while the float switch of the tank for transferring the fish water under pressure, for example, the float switch 202 of the tank 201 causes the contact 147 to open. During the transient period, when the contacts 146, 147 of both the float switches 102, 202 are closed, one of the two tanks has completed its transfer operation while the other tank continues its sucking up operation or when the contacts 146, 147 of both the float switches 102, 202 are open, one of the two tanks has completed its sucking up operation while the other tank continues its pressure transferring operation.

The above mentioned circuit is a control circuit in association with a low voltage source. The control circuit under the commercial voltage side connected across the bus bars 138a, 139 will now be described. This control circuit is comprised of the following six series circuits connected across the bus bars 138a, 139, respectively, that is, a series circuit including a push button switch 154 for stopping the operation of the apparatus as a whole and a coil of the above mentioned relay 141, a series circuit including a control switch 155a connected in parallel with normally open contacts 143a, 144a of relays 143, 144, respectively, a normally closed contact of a relay 142, and a coil 135a of an electromagnetic switch 135 for a vacuum pump, a series circuit including a control switch 155b connected in parallel with a normally open contact 142c of a relay 142 and normally closed contacts 143b, 144b of relays 143, 144, respectively, a normally closed contact 145b of a relay 145, a normally open contact 148a of a relay 148, and an electromagnetic switch coil 136a for a pressure pump 133 connected in parallel with an electromagnetic switch coil 159 of the motor which can drive the conveyor 126, a series circuit including a turn-over contact of a flip-flop relay 156 and a coil 123a of the electromagnetic valve 123 connected in parallel with a coil 122a of the electromagnetic valve 122, a series circuit including a manually operating push button switch 157a connected in parallel with a series circuit which is inclusive of a normally open contact 143c of a relay 143 and a normally closed contact 144d of a relay 144, a manually operating push button switch 158b, and a first coil 156a of the flip-flop relay 156, and a series circuit including a manually operating push button switch 158a connected in parallel with a series circuit which is inclusive of a normally open contact 144c of a relay 144 and a normally closed contact 143d of a relay 143, a manually operating push button switch 157b, and a second coil of the flip-flop 156. The above mentioned push button switches 157a and 157b are interlocked such that the switch 157a is normally open and the switch 157b is normally closed. Similarly, the push button switches 158a and 158b are interlocked such that the switch 158a is normally open and the switch 158b is normally closed. In addition, the flip-flop 156 is so constructed that an excitation of the first coil 156a causes the change-over contact to move to OFF side and a excitation of the second coil 156b causes the change-over contact to move to ON side.

The control circuit constructed as above described has the following features.

The float switches 102, 202 of the both tanks 101, 201 are of memory type switches. A circuit associated with the electromagnetic switch 135 for starting and stopping the motor 118 for driving the vacuum pump 117 is of OR circuit which is excited when at least one of the contacts 146, 147 of the float switches 102, 202 is closed. In addition, a circuit associated with electromagnetic switches 136, 159 for starting and stopping the motor 134 for driving the pressure pump 133 and the motor for driving the conveyor 126 is of NAND circuit which is excited when at least one of the above mentioned contacts 146, 147 is not opened. A control circuit for delivering an instruction of changing over the electromagnetic valves 122, 123 is of flip-flop circuit which is interlocked such that the change-over signal is delivered from the flip-flop circuit only when one of the two float switches 102, 202 is closed. The use of such special circuit construction makes it possible to change over the sucking up operation to the pressure transferring operation and vice versa alternately in a smooth manner. Such feature will more easily be understood by the mode of operation of the apparatus to be described later.

The apparatus for sucking up and transferring the fishes constructed as above described will operate as follows. The open end of the common suction hose 103 is immersed into the fish water in the fish tank 10 (FIG. 5). Then, the power source switch 137 (FIG. 6) is closed and the starting switch button 153 is pushed. At the beginning of the operation, the fish water is not in both the tanks 101, 201 at all, and as a result, the float switches 102, 202 close their respective contacts 146, 147. Thus, the relays 143, 144 are energized to start the motor 118 and hence operate the vacuum pump 117. In this case, the conveyor 126 and pressure pump 133 are maitained at their rest conditions. When the relays 143, 144 are energized, the first and second coils 156a, 156b of the flip-flop relay 156 are cut out of the power source and the turn-over contact of the flip-flop relay 156 is held at OFF side shown in FIG. 6. The pressure in the reducing tank 121 connected to the suction side of the vacuum pump 117 is decreased to a negative pressure whereby the degree of vacuum is gradually increased. Since the lower operating chambers 14e, 14e of the four way change-over valve 114 are communicated through the electromagnetic valve 122 to the reducing tank 121 and the upper operating chambers 14d, 14d are communicated through the electromagnetic valve 123 with the pressure tank 128 (or with the atmospheric pressure when the pressure tank 128 is not under pressure), the difference in pressure between the upper and lower operating chambers causes the diaphragm 14c to be pushed downwardly. As a result, the three way change-over valve 14a causes the port 14l to communicate with the port 14m, while the three way change-over valve 14a' causes the port 14k to communicate with the port 14l as shown in FIG. 5.

Thus, the exhaust side of the vacuum pump 117 is opened to the outside atmosphere and the suction side is communicated through the pipe 115, ports 14l and 14k of turn-over valve 14a', pipe 213 and air supply and extraction opening 208 with the tank 201. As a result, the presssure in the tank 201 is reduced by the vacuum pump 117 and becomes a negative pressure and hence the fish water in the fish tank 110 is sucked up through the common suction hose 103 and fish water suction pipe 204 into the tank 201 thereby effecting the fish water sucking up operation. The fish water in the tank 201 is gradually increased and its water level arrives at the upper level limit a of the float switch 202. Then, the contact 147 of the float switch 202 becomes opened to deenergize the relay 143. Thus, the contacts 143a, 143c are opened and the contacts 143b, 143d are closed to excite the second coil 156b of the flip-flop 156 to change over the contact. Thus, both the electromagnetic valves 122, 123 are excited to change-over these valves and the operations of the pressure pump 133 and conveyor 126 are started. In this condition, the deenergization of the vacuum pump 117 is still maintained.

If the electromagnetic valves 122, 123 are excited, the upper chambers 14d of both the three way valves 14a, 14a' are communicated with the reducing tank 121 and the lower chambers 14e are communicated with the pressure tank 128, respectively. As a result, the change-over valve 114 is changed over to communicate the suction side of the vacuum pump 117 through the pipe 113 and air supply and extraction opening 108 with the pump 101 and communicate the exhaust side of the pressure pump 133 through the pipe 213 and air supply and extraction opening 208 with the tank 201. Thus, the space in the tank 101 is subjected to a negative pressure to start the fish water sucking up operation and the space in the tank 201 is subjected to a positive pressure to start the fish water pressure transferring operation.

Thus, the fish water filled in the tank 201 is delivered through the fish water supply pipe 206 and delivery hose 111 to the fish water separator 112 where the fishes are separated from water and transferred onto the conveyor 126, while the water is fed back through the feeding back hose 127 into the fish tank 110.

As described above, the fish water sucking up operation in the tank 101 and the fish water pressure transferring operation in the tank 201 are simultaneously effected. The sucking up head and pressure head are changed in dependence with the place where the apparatus for sucking up and transferring fishes is used and the condition under which the apparatus is operated. Now, if the fish water pressure transferring operation in the tank 201 is completed earlier than the fish water sucking up operation in the tank 101, both the float switches 102, 202 close their contacts 146, 147. As a result, the relay 143 is energized to close the contact 143b, thereby stopping the pressure pump 133. Thus, the fish water pressure transferring operation in the tank 201 is immediately stopped. But, the vacuum pump 117 continues its sucking up operation independent of the completion of the pressure transferring operation.

Under such condition, the closing of both the contacts of the float switches 102, 202 results in an interlock of both the first coil 156a and second coil 156b of the flip-flop relay 156 and hence in a cut off of the connection between these coils and the power source. As a result, the contact of the relay 156 maintains the existing operation. The electromagnetic valves 122, 123 serve to maintain the changed over condition that the tank 101 is in its sucking up operation and the tank 201 is in its pressure transferring operation.

Thus, the sucking up operation in the tank 101 only is effected. Thus, the fish water in the tank 101 is gradually increased to open the contact 146 of the float switch 102 whereby the relay 143 is energized and the relay 144 is deenergized. Then, the first coil 156a of the flip-flop relay 156 is excited to change-over the contact 146 to OFF side. Thus, the electromagnetic valves 122, 123 are set to OFF side and the change-over valve 114 causes the tank 101 to be changed over to the pressure transferring operation and causes the tank 201 to be changed over to the sucking in operation. In addition, the pressure pump 133 in the rest condition is started. At this instant, the tank 101 is changed over from the sucking up operation to the pressure transferring operation and the tank 201 is changed over from the ready condition after completion of the pressure transferring operation to the sucking up operation.

In the above described case, the pressure transferring operation has been completed earlier than the sucking up operation. Conversely, if the sucking up operation in the tank 101 has been completed earlier than the pressure transferring operation, the contacts 146, 146 of both the float switches 102, 202 become open to stop the vacuum pump 117 and continue the operation of the pressure pump 133. In addition, the flip-flop relay 156 is interlocked to maintain the existing operating condition of the contacts. Thus, the sucking up operation in the tank 101 is stopped and the tank 101 becomes ready for the next pressure transferring operation, while the pressure transferring operation in the tank 201 is still continued. When the pressure transferring operation in the tank 201 is completed, the change-over of the flip-flop relay 156, the change-over of the four way change-over valve 114 and the start of the vacuum pump 117 are effected. Thus, the change-over operation from the ready condition after completion of the sucking up operation to the pressure transferring operation in the tank 101 and from the pressure transferring operation to the sucking up operation in the tank 201 can be effected in a smooth manner.

As stated hereinbefore, when the operations in the tanks 101, 201 are automatically changed over, even if either one of the sucking up and pressure transferring operations has been completed prior to the other operation, such preceding operation awaits its change-over operation until the succeeding operation is completed. As a result, if the fish water in both the two tanks 101, 201 arrives at the upper level limit a, the operation in each tank is changed over to the pressure transferring operation and if the fish water in both the two tanks 101, 201 arrives at the lower level limit b, the operation in each tank is changed over to the sucking up operation. The measures described can efficiently utilize the space in the tank and can automatically and simultaneously effect the sucking up and pressure transferring operations in a repeated manner without involving a hunting operation due to the difference in pressure between the sucking up operation and the pressure transferring operation.

The above described apparatus according to the invention is capable of changing over the pressure in the tanks 101, 201 from a negative pressure to a positive pressure and vice versa and hence simultaneously and continuously effecting the sucking up and pressure transferring operations, thereby efficiently effecting the transfer of the fishes to any desired place. In addition, the sucking up operation is effected under the negative pressure and the pressure transferring operation is effected under the positive pressure, and as a result, the fishes at a lower place can be sucked up and can be transferred to a higher place in a simple manner without deteriorating the fish body. Thus, the apparatus is significantly efficient in keeping the good quality of the fishes.

In addition, the apparatus for sucking up and pressure transferring fishes according to the invention is provided with an automatic control circuit which in the case of changing over from the sucking up operation to the pressure transferring operation in the tanks 101, 201, the change-over operation at the tank in which the preceding operation has been completed is awaited until the operation in the succeeding tank is completed, and subsequently the change-over operations of both the tanks are simultaneously effected. Thus, it is possible to effect the change-over operation effectively by utilizing the space in the tanks. In addition, the difference in pressure between the sucking up operation and the pressure transferring operation can increase the number of repetitions of the change-over operations and can completely prevent the disturbance in the automatic change-over control, that is, the hunting which is liable to be produced owing to the automation of the change-over operation. Moreover, the sucking up and pressure transferring operations can be effected in a stable manner independent of the variation of the suction head and pressure head, and as a result, the apparatus may be used at any place without any restriction and may be considerably useful for mounting it on fishing boats etc.

In FIGS. 9 to 13 and FIGS. 17 to 19 there is shown a fish landing apparatus which can be mounted on the deck of fishing boats such as fish carrying vessels etc., and particularly there is shown a multi-purpose apparatus for sucking up and transferring fishes which at the fishing ground can suck up the fishes in nets together with sea water, which can deliver the sea water into the sea and which can deliver the fishes into the fish tank and transfer them to a desired place or can transfer at the landing and pier the fishes mixed with ice in the fish tank onto the land.

FIGS. 9 and 10 diagrammatically illustrate the mode of using the apparatus according to the invention.

FIG. 9 diagrammatically illustrates the mode of transferring the fishes 362 cooled by ice in the fish tank 310 onto a truck 361 ready on the pier. FIG. 10 diagrammatically illustrates the mode of sucking up the fishes caught in a net 363 into a fish tank 310.

The above described fish sucking up apparatus is constructed as shown in FIGS. 9, 10, 11 and 12. The fish sucking up apparatus is comprised of a vacuum producing unit 365 essentially consisting of a vacuum pump 317 and a tank unit 364 essentially consisting of a tank 301. The vacuum producing unit 365 is arranged at a suitable place such as a deck of a fishing boat 360.

The tank unit 364 is hung down from a derrick crane 368a usually installed on the deck of the fishing boat 360 with the aid of a hanging ring 367 provided for the top of the tank or a hanging carriage mechanism 368 such as rails 368b spanned over the fish tank 310 such that the tank unit 364 is raised and lowered as well as reciprocated in a horizontal direction.

As shown in FIG. 13, the vacuum producing unit 365 is comprised of a pump such as a vacuum pump 317 whose suction side is connected to a water supply pipe 369 and exhaust side is connected to a silencer 370 and a switchboard 371 which controls an automatic operation. The vacuum pump 317 and switchboard 371 are arranged on a common base and surrounded by a casing, if necessary, so as to form a compact unit connected to a power source.

The tank unit 364 is hung down at a position which is higher than the fish tank 310 disposed on the bottom of the fishing boat 360 and is comprised of a tank 301 and a control box 372. The tank 301 is of a pressure resistant container. As shown in FIG. 11, the tank 301 is divided into upper and lower chambers by means of a partition plate 312 which is comprised of an inclined portion 312' such as a wire net or hurdle etc. which can pass water but prevent a passage of the fishes 362. The upper chamber constitutes a fish chamber 301a and the lower chamber constitutes a water chamber 301b. The tank 301 is provided therein with a level detector 302 which can detect the upper and lower level limits of the liquid level so as to deliver an electric signal.

The tank 301 is provided at its top wall with an air supply and extraction opening 308, at the lower part and at directly above the lowest end of the inclined plate 312' with an outlet opening 375 which is opened and closed by a valve 374 in response to the reciprocal movement of a plunger with respect to a cylinder 373, and at a suitable lower part of the fish chamber 301a with a fish water supply opening 376 connected to a fish water suction pipe 304.

The tank 301 may be provided at the lower part of the water chamber 301b with a water delivery opening 379 connected through a draining pump 377 to a water delivery pipe 378, if necessary.

The fish water suction pipe 304 and the water delivery pipe 378 are connected through universal joints to the fish water supply opening 376 and water delivery opening 379, respectively, for ease of operation. In addition, the fish water suction pipe 304 and the water delivery pipe 378 are provided at their ends with a mouthpiece 383, a check valve and a fitting 380 with a check valve, respectively.

As shown in FIG. 12, the check valve 305 may be provided for the fish water supply opening 376. In short, an automatic anti-counterflow mechanism for preventing a flow of the fish water from the tank 301 is provided in the fish water suction pipe 304 adjacent the fish water supply opening 376 and an automatic anti-counterflow mechanism for preventing the water from flowing into the tank 301 is provided in the water delivery pipe 378 adjacent the water delivery opening 379. As a result, the apparatus according to the invention is so constructed that during the fish water sucking up operation water is prevented from flowing from the water delivery pipe 378 and during the fish transferring operation the fishes are prevented from flowing into the fish water suction pipe 304. For this purpose, various changes and modifications are possible.

A control box 372 shown in FIG. 13 is comprised of an offset type three way change-over electromagnetic valve 322, spring offset type four way electromagnetic valve 323, strainers 381, 381, vacuum tank 321, check valve 319 and terminal board 382. These members being interconnected to each other as shown in FIG. 13 with the aid of air pipings and electric wirings so as to effect automatic fish water sucking up and transferring operations to and from the tank 301. That is, the vacuum tank 321 is connected through an air pipe provided with the check valve 319 which prevents a counterflow toward the vacuum tank 321 from the suction side of a vacuum pump 317, through the three way change-over electromagnetic valve 322 to the air supply and extraction opening 308, and through the four way change-over electromagnetic valve 323 to two operating chambers of an air cylinder 373.

The terminal board 382 is connected to the switchboard 371, motor 385 for driving the water delivery pump 377, level detector 302 and both solenoids 322',323' of the electromagnetic valves 322, 323 so as to constitute an automatic control system which can energize the electromagnetic valves 322, 323 when the fish water is sucked up into the tank 301, and deenergize the electromagnetic valves 322, 323 and stop the motor 385 when the fishes are transferred from the tank 301.

In the fish sucking up apparatus constructed as above described, in order to prevent the fish water sucking up pipe 304 whose diameter is small relative to the length of the fish body from being clogged by the fishes as well as to make the resistance against the suction extremely small, an improvement is made with respect to the configuration of the suction opening and the fitting of the check valve.

The fish body immersed in the ice water in the fish tank 310 and usually larger in specific weight than water tends to sink to the depth of the fish tank. In general, the depth of the fish tank 310 is of a horizontal plane normal to the vertical so that the fish body arriving at the fish tank depth becomes substantially horizontal. It is a matter of course that fish bodies stacked on the existing fish bodies are inclined to take their horizontal positions. Certain fish bodies sandwiched between the fish bodies and lying in vertical direction become gradually horizontal in position owing to movement such as rolling, pitching etc. of boats, and as a result, almost all of the fish bodies are in their horizontal positions when the fishing boat enters a port.

Experimental tests have yielded the result that if the fish body lying in its horizontal position is sucked up into a downwardly enlarging suction opening 383' as shown in FIG. 14, the head portion and/or tail portion of almost all of the fish bodies are urged against the tapered portions of the opening 383' so as to occupy a position which prevents a flow of water, that is it is difficult to make the fish body parallel with the lengthwise direction of the suction pipe, and thus the sucking up efficiency becomes lower.

If the suction opening 383' is made to open in the horizontal direction as shown in FIG. 15, the sucking up efficiency becomes higher if compared with the case shown in FIG. 14 since more than one half of the total fish bodies lie in substantially horizontal position.

In addition, if the suction opening 383' is made open in the horizontal direction and a part of the outwardly enlarging wall is made horizontal as shown in FIG. 16, the flow speed in the suction opening becomes unbalanced, and as a result, the fish body is easily turned to its horizontal position, thereby improving the sucking up efficiency.

As seen from the above, the suction pipe 383 may be of a bent pipe 383-1 as shown in FIG. 17 or a tapered pipe 382-1 as shown in FIG. 18 which is gradually enlarged outwardly in an unsymmetrical tapered portion or a combination as shown in FIG. 19 of the bent pipe shown in FIG. 17 and the unsymmetrical enlarged tapered portion shown in FIG. 18, such suction pipe 383 being connected to the fish water suction pipe 304 usually arranged in a vertical hanging down state.

In addition, the suction pipe 383-3 shown in FIG. 19 may be provided at its bent portion with a check valve 384 such as a swing valve which is simple in construction. The suction pipe 383 with such check valve has the advantage of simplifying the construction of the tank 301.

The operation of the fish sucking up apparatus constructed as above described will now be described. At first, in the fishing ground, the fishes 362 caught in fishing net 363 are to be sucked up in the fish tank 310. In this case, the tank 301 is hung down from rails 368b as shown in FIG. 10 and the fish water suction pipe 304 is supported by the crane 368a. The free end of the fish water suction pipe 304 is thrown into the fishing net 363 and the water delivery opening fitting 380 connected to the free end of the water delivery pipe 378 is thrown into the sea water. Then, the vacuum pump 317 is energized. As a result, the vacuum tank 321 connected to the suction side of the pump 317 becomes decreased in pressure, thereby gradually increasing the degree of vacuum. In this condition, the liquid level in the tank 301 lies at its low region so that the liquid level detector 302 detects such low level to deliver a signal which energizes both the electromagnetic valves 322, 323 as well as energizes the pump 377. As a result, the vacuum tank 321 communicates through the three way electromagnetic valve 322 with the tank 301 thereby making the inside pressure of the tank 301 negative. If the four way electromagnetic valve 323 is energized, the left chamber 273a of the air cylinder 273 shown in FIG. 13 communicates with the vacuum tank 321 and the right chamber 273b communicates through the strainer 381 with the outside atmosphere, and as a result, the piston rod of the air cylinder 373 is moved to the right, i.e. is moved forwardly to completely close the exhaust opening 375 with the aid of the valve 374. Thus, the inside space of the tank 301 gradually reaches a higher vacuum, thereby sucking up the fish water in the net 363 through the suction opening fitting 383, suction pipe 304 and fish water inlet opening 376 into the fish chamber 301a of the tank 301.

Water flowing through the partition plate 312 into the water chamber 301b is exhausted by means of the water delivery pump 377 and thus thrown through the water delivery opening 379, water delivery pipe 378 and water delivery opening fitting 380 into the sea water. As the above operation proceeds, the amount of the fishes in the tank 301 gradually increased to raise the liquid level. The above operation is the fish water sucking up step.

If the liquid level arrives at the upper level limit of the liquid level detector 302, the liquid level detector 302 causes a change-over of the electromagnetic valves 322, 323 thereby deenergizing these valves and stopping the rotation of the motor 385 for driving the pump 377.

The change-over operation of the three way electromagnetic valve 322 permits the air supply and extraction opening 308 of the tank 301 to communicate through the strainer 381 with the outside atmosphere. The change-over operation of the four way electromagnetic valve 323 permits the left chamber 373a of the air cylinder 373 to communicate with the outside atmosphere and permits the right chamber 373b to communicate with the vacuum tank 321, and as a result, the piston rod of the air cylinder 373 is moved to the right, i.e. is moved rearwardly to make the valve 374 at the exhaust opening 375 of the tank 301 completely open thereby delivering the fish water in the tank 301 through the exhaust opening 375 into the fish tank 310. This is the fish water trnsferring step.

If the total amount of the fish water in the tank 301 is exhausted and the liquid level arrives at the lower level limit of the liquid level detector 302, the liquid level detector 302 causes a change-over of the fish water transferring step to the above mentioned fish water sucking up step. As described above, the fish water sucking up step and the fish water transferring step may automatically be changed over in response to the lower and upper level limits of the liquid level of the fish water in the tank 301.

Next, when a carrying vessel 360 is returned to the port and the fishes are unloaded on the shore, the tank unit 364 is moved onto the truck 361 by means of the crane 368a and the water delivery pipe 378 is thrown into the fish tank 310 as well as the fish water suction pipe 304 is hung down into the fish tank 310. Then, the suction opening fitting 383 of the fish water suction pipe 304 is moved at suitable time to effect the sucking up of the fish water and the fish water sucking up step and the fish water transferring step are alternately changed over. Thus, it is possible to directly transfer the fishes 362 in the fish tank 310 through the tank 301 onto the truck 361 without using any carrying member such as a conveyor belt etc.

The suction opening fitting 383 is constructed such that the fish bodies can smoothly be sucked into the suction pipe as described with reference to FIGS. 16 to 19. Thus, an extremely high efficient sucking up operation can be performed.

In the apparatuses shown in FIGS. 9 to 11, the check valve 384 provided for the suction opening fitting 383 is always immersed into the water. As a result, during the fish sucking up step, even when the check valve 384 is not completely closed, there is no risk of the fish water remaining in the suction pipe 304 counterflowing into the fish water side, thereby avoiding troubles encountered in the fish water sucking up operation.

In the apparatus shown in FIG. 13, the vacuum producing unit 365 which is heavy in weight is stationary installed on a suitable place or the fishing boat 360 and the tank unit 364 is raised and lowered as well as reciprocated in horizontal directions by means of the hanging carrying mechanism 368 installed on the fishing boat 360. The measures thus provided ensure a sucking up of the fishes in the sea water into the fish tank 310 as well as a direct transfer and loading of the fishes cooled by the ice water in the fish tank 310 to and on the truck 361. Thus, the apparatus according to the invention significantly contribute to the fishing industry as a multi-purpose fish sucking up apparatus which can simplify the operation.

The most preferable embodiments of the invention have been described. The invention is not limited to the above described embodiments and many changes and modifications may be made without departing from the spirit and scope of the invention which are claimed in the appended claims.

What is claimed is:

1. An apparatus for sucking up and transferring fishes comprising a hermetically closed tank provided at its upper portion with air opening means for extracting air therefrom and supplying air thereto and provided at its lower portion with a fish water suction opening connected to a fish water suction pipe and fish transfer and water delivery opening means connected to fish transfer and water delivery pipe means, and an air supplying means connected to said air opening means, a fish water separator for separating the fish water sucked up into the closed tank into fishes and water, control means for alternately changing over the air extracting means and the air supplying means and starting and stopping these means, and a control valve means for (1) communicating the fish water suction pipe with the closed tank and closing the fish transfer pipe means during the air extracting step and (2) closing the fish water suction pipe and communicating the fish transfer pipe means with the closed tank during the air supplying step.

2. An apparatus for sucking up and transferring fishes as claimed in claim 1, wherein said air opening means comprises a common opening provided at the upper portion of said closed tank for both air extraction and air supply, and said air extracting means and said air supplying means respectively include a suction pipe and a delivery pipe each connected to a vacuum blower, and said apparatus further comprising change-over means for alternately communicating said common opening with said suction pipe and said delivery pipe.

3. An apparatus for sucking up and transferring fishes as claimed in claim 1, wherein said fish water separator is connected to said fish transfer and water delivery pipe means.

4. An apparatus for sucking up and transferring fishes as claimed in claim 1, wherein said fish transfer and water delivery opening means includes a fish transfer opening and a separate water delivery opening associated with said closed tank, wherein said fish water separator comprises a partition plate disposed within said tank and inclined to said fish transfer opening for permitting passage of water but preventing passage of the fishes, said partition plate separating said closed tank into (1) a fish chamber including said air opening means and said fish water suction opening and said fish transfer opening and (2) a water chamber including said water delivery opening.

5. An apparatus for sucking up and transferring fishes as claimed in claim 1 wherein said control means includes a liquid level detector and means for making said air extracting means inoperative and said air supplying means operative when said liquid level detector detects the upper limit level and for making said air extracting means operative and said air supplying means inoperative when said liquid level detector detects the lower limit level.

6. An apparatus for sucking up and transferring fishes as claimed in claim 1, wherein said closed fish tank and said fish water separator constitute a unit which is hung down by a hanging and carrying mechanism arranged on a fish tank of a fishing boat, and wherein said air extracting means and air supplying means are stationarily arranged on said fishing boat.

7. An apparatus for sucking up and transferring fishes comprising two sets of hermetically closed tanks each of which is provided at its upper portion with a common air supply and extraction opening and its lower portion with a fish water suction opening connected to a fish water suction pipe and a fish water delivery opening connected to a fish water delivery pipe, an air extracting means, an air supplying means, a fish water separator connected to said fish water delivery pipe, a control means for alternately communicating said air extracting means and said air supplying means with each of said common air supply and extraction openings of said two closed tanks in an exchangeable manner, and control valve means for communicating said fish water suction pipe with said closed tank and closing said fish water delivery pipe during an air sucking up step and closing said fish water suction pipe and communicating said fish transfer pipe with said closed tank during an air supplying step.

8. An apparatus for sucking up and transferring fishes as claimed in claim 2, wherein said change-over means for alternately communicating said common air supply and extraction opening with the suction pipe of said vacuum blower and with said delivery pipe is comprised of a diaphragm type four way change-over valve which operates in response to the difference in air pressure between a negative pressure obtained by said vacuum blower and a positive pressure not less than the atmospheric pressure.

9. An apparatus for sucking up transferring fishes as claimed in claim 7 wherein said control means for alternately communicating said air extracting means and said air supplying means with each of said common air supply and extraction openings of said two closed tanks in an exchangeable manner is comprised of a diaphragm type four way change-over valve which operates in response to the difference in air pressure between a negative pressure obtained by said air extracting means and a positive pressure obtained by said air supplying means.

10. An apparatus for sucking up and transferring fishes as claimed in claim 7 wherein said control means includes a liquid level detector for making said air extracting means inoperative when said liquid level detector detects an upper limit level in each of both said closed tanks and for making said air supplying means inoperative when said liquid level detector detects a lower limit level, said control means comprising means including a memory circuit for holding a preceding detected signal delivered from said liquid level detector to control the succeeding detected signal as delivered from said liquid level detector, and a logical product circuit (AND circuit) for effecting the change-over operation between said air supplying operation and said air extracting operation for each of both two closed tanks by means of said succeeding detected signal.

* * * * *